(12) United States Patent
Funahashi et al.

(10) Patent No.: US 6,253,034 B1
(45) Date of Patent: Jun. 26, 2001

(54) CAMERA

(75) Inventors: Akira Funahashi, Sakai; Junichi Tanii, Izumi, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/234,438

(22) Filed: Jan. 21, 1999

Related U.S. Application Data

(63) Continuation of application No. 08/791,528, filed on Jan. 30, 1997, now Pat. No. 5,884,112.

(30) Foreign Application Priority Data

Jan. 31, 1996 (JP) .................................................. 8-14813
May 13, 1996 (JP) ................................................ 8-117709

(51) Int. Cl.[7] ........................... G03B 17/02; G03B 17/26
(52) U.S. Cl. ......................... 396/539; 396/535; 396/538
(58) Field of Search .................................. 396/176, 301, 396/418, 535, 538, 539, 540; 352/242

(56) References Cited

U.S. PATENT DOCUMENTS

| | | | |
|---|---|---|---|
| 3,508,482 | * 4/1970 | Taylor | 352/242 |
| 3,807,841 | * 4/1974 | Dudley et al. | 352/72 |
| 4,109,264 | * 8/1978 | Pizzuti et al. | 396/539 |
| 4,153,351 | * 5/1979 | Stocki | 352/72 |
| 4,666,278 | * 5/1987 | Uematsu et al. | 396/539 |
| 4,712,898 | * 12/1987 | Haraguchi | 396/539 |
| 5,001,505 | 3/1991 | Tosaka | 396/418 |
| 5,077,572 | 12/1991 | Morisawa | 396/539 |
| 5,150,140 | 9/1992 | Kitazawa | 396/535 |
| 5,264,887 | 11/1993 | Fukahori | 396/354 |
| 5,333,022 | * 7/1994 | Katagiri et al. | 396/539 |
| 5,426,478 | 6/1995 | Katagari et al. | 396/535 |
| 5,600,401 | 2/1997 | Kato et al. | 396/535 |
| 5,606,389 | 2/1997 | Sugita | 396/539 |
| 5,655,172 | 8/1997 | Omi et al. | 396/538 |
| 5,708,896 | * 1/1998 | Machida | 396/539 |

OTHER PUBLICATIONS

Camera Review, "A single-lens reflex camera is just a box, if it does not contain batteries", Tsuyoshi Konno, vol. 27, Jan. 1, 1983.

* cited by examiner

*Primary Examiner*—Alan A. Mathews
(74) *Attorney, Agent, or Firm*—McDermott, Will & Emery

(57) ABSTRACT

The present invention comprises a camera that is capable of both feeding a long strip of film that is housed in a cartridge in a wound-up fashion and rewinding said film, wherein a battery is placed above or below the film conveyance path between the cartridge bay and the spool bay such that its axis is essentially parallel to the optical axis.

18 Claims, 8 Drawing Sheets

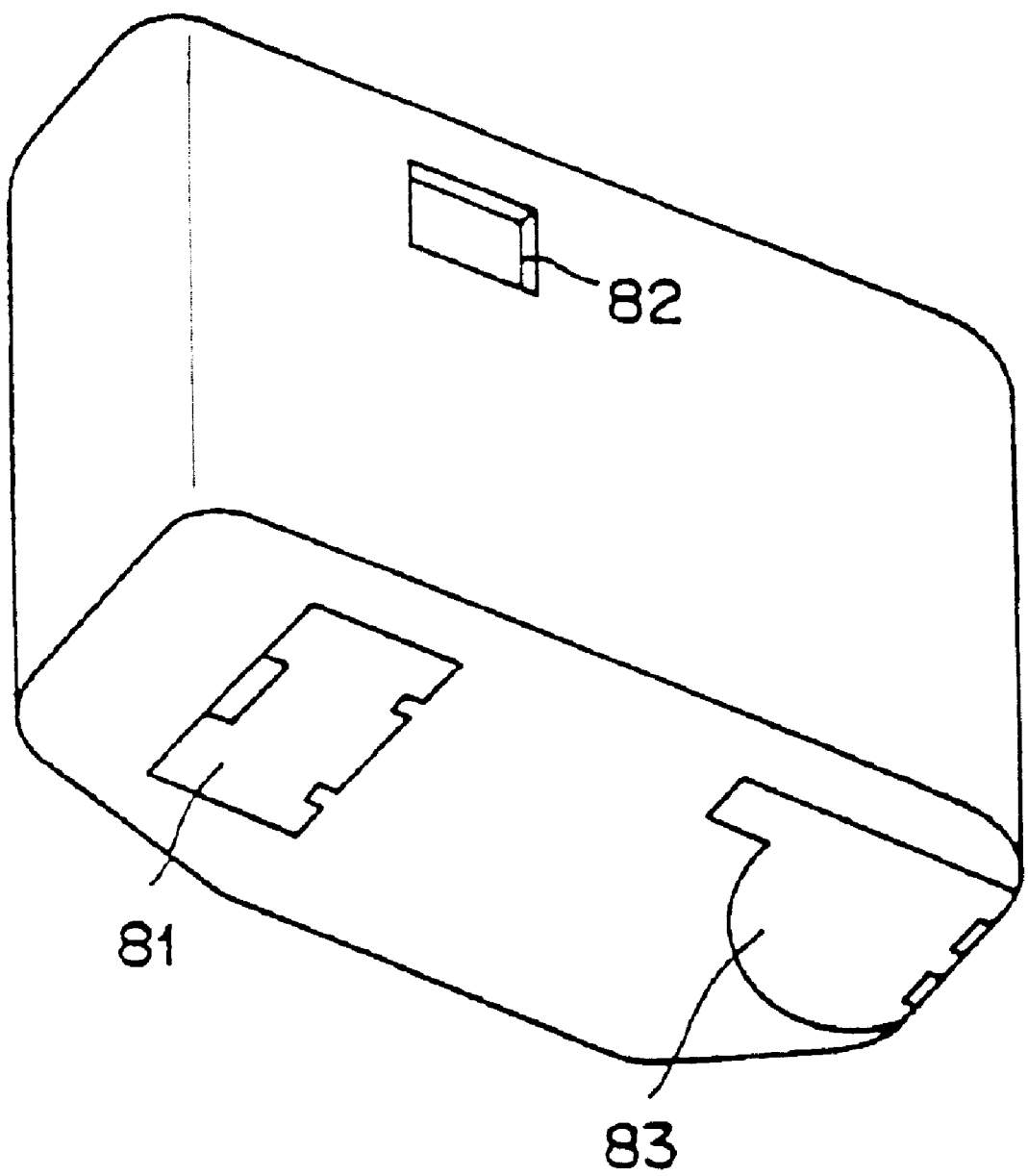

CAMERA

This is a continuation application of Ser. No. 08/791,528, filed Jan. 30, 1997, now U.S. Pat. No. 5,884,112.

BACKGROUND OF THE INVENTION

1. Field of the Invention

The present invention pertains to a camera, and more particularly, to a camera that is capable of both feeding a long strip of film that is housed in a cartridge in a wound-up fashion and rewinding said film.

2. Description of the Related Art

In recent years, an advanced photograph system camera has been developed. This advanced photograph system camera is characterized in that it uses a film cartridge that is capable of both feeding a long strip of film that is housed in said cartridge in a wound-up fashion and rewinding said film. It has electric components such as a battery or condenser housed in its body.

In conventional cameras, a battery or condenser is located in the grip area or below the lens mount such that it is aligned in the direction perpendicular to the optical axis.

However, if a construction is employed in which the battery or condenser is located in the grip area, or if they are placed below the lens mount such that they are aligned in the direction perpendicular to the optical axis, particularly in a zoom lens camera employing a cylindrical lens mount, the advanced photograph system camera will increase in size.

SUMMARY OF THE INVENTION

The object of the present invention is to provide a camera that can house a battery or condenser without an increase in size.

In order to attain the object described above, the present invention comprises a camera that is capable of both feeding a long strip of film that is housed in a cartridge in a wound-up fashion and rewinding said film, wherein a battery is placed above or below the film conveyance path between the cartridge bay and the spool bay such that its axis is essentially parallel to the optical axis.

The present invention also comprises a camera that uses a film cartridge that is capable of both feeding a long strip of film that is housed in said cartridge in a wound-up fashion and rewinding said film, wherein a condenser is placed above or below the film conveyance path between the cartridge bay and the spool bay such that its axis is substantially parallel to the optical axis.

These and other objects, advantages and features of the invention will become apparent from the following description thereof taken in conjunction with the accompanying drawings which illustrate specific embodiments of the invention.

BRIEF DESCRIPTION OF THE DRAWINGS

FIG. 14 is a perspective view of another embodiment seen from the bottom side.

In the following description, like parts are designated by like reference numbers throughout the several drawings.

DESCRIPTION OF THE PREFERRED EMBODIMENTS

The embodiments of the camera pertaining to the present invention are explained below with reference to the attached drawings. The same numbers are used for the identical components and areas in each embodiment.

The first embodiment will be explained with reference to FIGS. 1 through 3.

Figure 1:
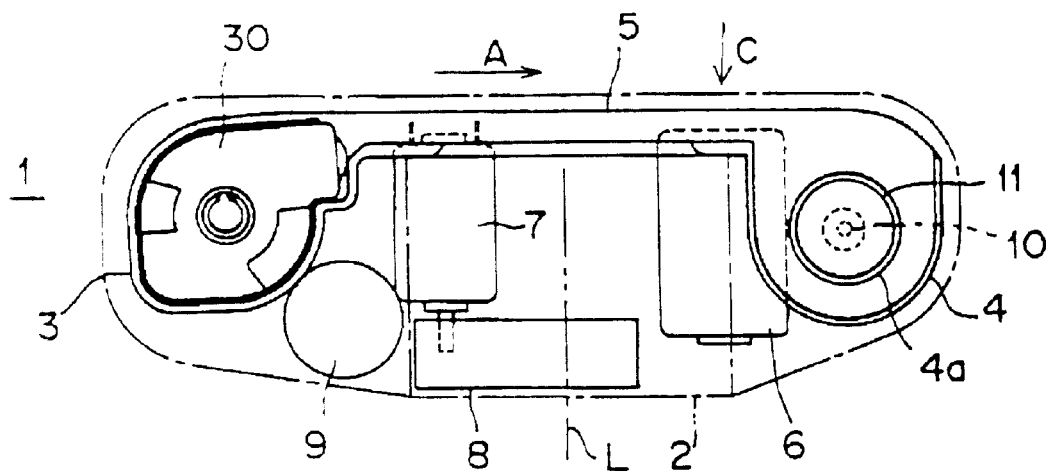
FIG. 1 is a plan view of important parts of the first embodiment of the camera pertaining to the present invention.
Figure 2:
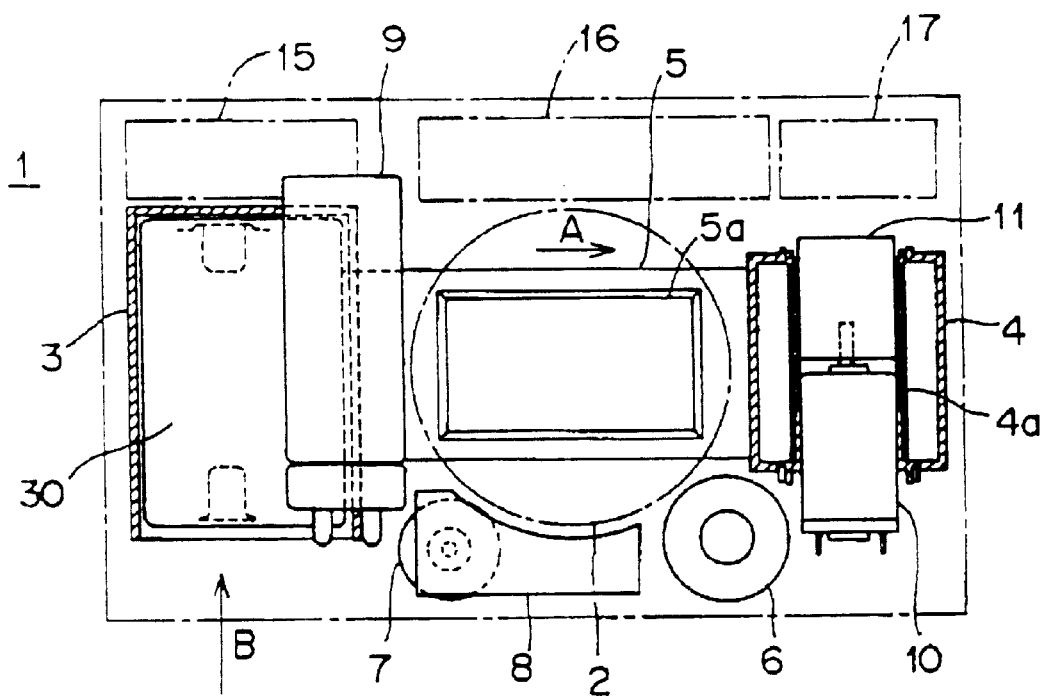
FIG. 2 is a front elevation of the camera shown in FIG. 1.
Figure 3:
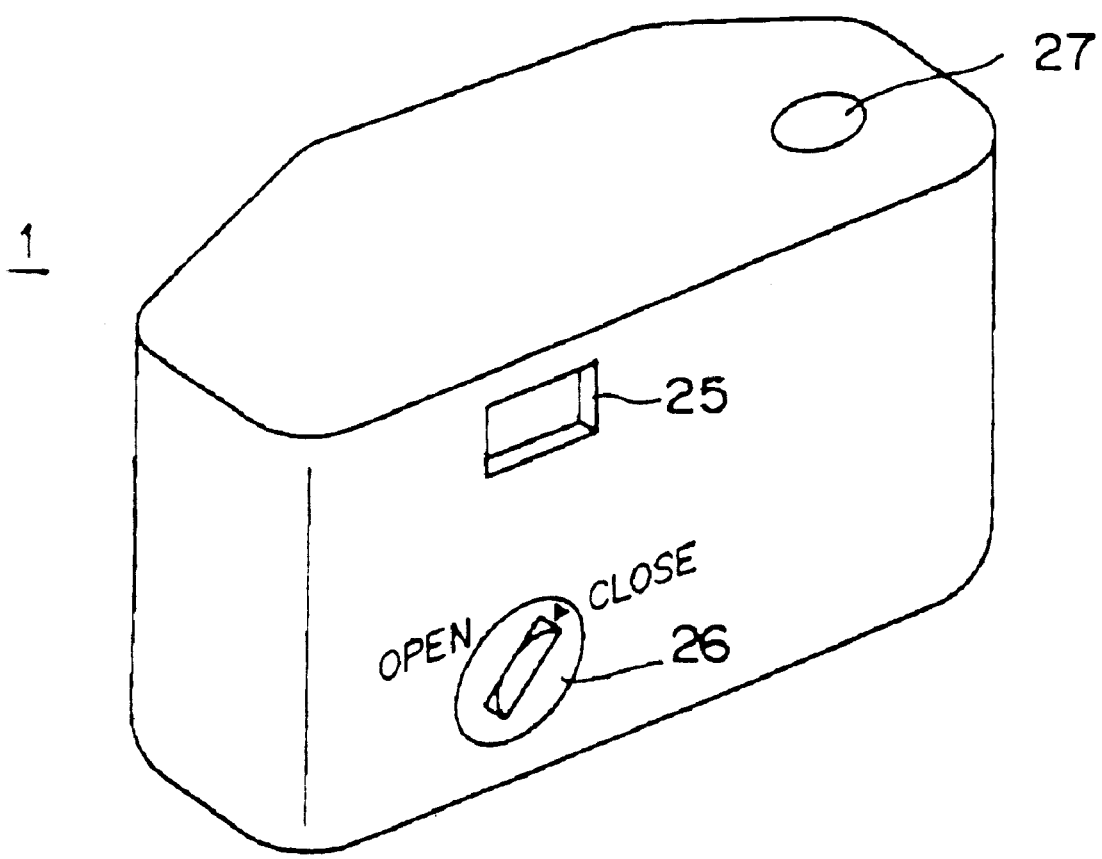
FIG. 3 is a perspective view of the camera shown in FIG. 1 seen from the rear side.

As shown in FIGS. 1 and 2, advanced photograph system camera body 1 is equipped with cylindrical lens mount 2, cartridge bay 3 and spool bay 4 that are located to the left and right of lens mount 2, respectively, film conveyance path 5 located behind lens mount 2, battery 6, zoom motor 7, condenser 9, feeding motor 10 and feeding reducer 11 situated below film conveyance path 5, cartridge drive unit 15, block 16 comprising a finder, etc., and flash unit 17.

Cartridge bay 3 and spool bay 4 are substantially cylindrical. Their axes are substantially perpendicular to optical axis L of camera body 1. Cartridge bay 3 and spool bay 4 are connected via film conveyance path 5. Rectangular screen frame 5a is formed on film conveyance path 5 on the side of the lens mount. Screen frame 5a is set to be substantially equal in size to the film frame. It is necessary to design the inner diameter of lens mount 2 so that it is larger than the diagonal length of screen frame 5a, such that the light rays for photo-taking are not interrupted. Consequently, there is some space between the lower edge (or the upper edge) of film conveyance path 5 and the lower edge (or the upper edge) of lens mount 2. Since the difference between the film frame diagonal length and the width of the film in an advanced photograph system camera is larger than in the case of conventional 135 film, this space is larger accordingly. Film conveyance path 5 is perpendicular to optical axis L. In conventional 135 film, since the ratio of the film width to the film frame diagonal length is large, said space when 135 film is used is smaller than in an advanced photograph system camera.

Cylindrical battery 6 is placed below film conveyance path 5 and toward spool bay 4 such that its axis is substantially parallel to optical axis L. This battery 6 is used as the power supply for motors 7 and 10, flash unit 17, etc. Zoom motor 7 is, together with zoom reducer 8, placed below film conveyance path 5 and toward cartridge bay 3 such that its rotational drive shaft is substantially parallel to optical axis L. This zoom motor 7 is used to move the camera lens, which is not shown in the drawings, along the optical axis.

Cylindrical condenser 9 is placed between lens mount 2 and cartridge bay 3 such that its axis is substantially perpendicular to optical axis L. This condenser 9 is used to apply a high voltage to flash unit 17, etc. Feeding motor 10 is inserted, together with cylindrical feeding reducer 11, into hollow shaft 4a in spool bay 4 such that its rotational drive shaft is substantially perpendicular to optical axis L. This feeding motor 10 is used to feed and rewind the film.

Cartridge drive unit 15 is placed above cartridge bay 3. This cartridge drive unit 15 is a device to open and close the light-shielding door on film cartridge 30 described below, for the purpose of preventing exposure of the film. Block 16 comprising a finder, AF (auto-focus) control circuit, AE (auto-exposure) control circuit, etc., is located above film conveyance path 5. Flash unit 17 is located above spool bay 4.

Film cartridge 30 is loaded in the camera by opening a cartridge cover (not shown in the drawings) at the bottom of camera body 1 and inserting the cartridge into cartridge bay 3 in the direction of arrow B. Therefore, unlike the construction of a conventional camera body which has on its back side a wide-area rear cover for the purpose of film loading, camera body 1 does not have a wide area rear cover on its back side. Film cartridge 30 houses a wound long strip of film in its cylindrical housing compartment. The film may be fed out of the outlet/inlet that protrudes from the cylindrical surface of the housing compartment by means of feeding motor 10 which works as the drive source, and may move along film conveyance path 5 in the direction of arrow A. It may also be rewound along film conveyance path 5 in the direction opposite to the direction of arrow A. The film that is fed out and exposed is housed in spool bay 4.

Battery 6 is loaded in the battery compartment by rotating and removing battery cover 26 on the back side of camera body 1 and inserting the battery in the direction of arrow C. In FIG. 3, 25 is a finder eyepiece and 27 is a release button.

Advanced photograph system camera body 1 of the construction described above has battery 6 and zoom motor 7 below film conveyance path 5 between cartridge bay 3 and spool bay 4 such that their axes are substantially parallel to optical axis L, and therefore the empty space below film conveyance path 5 may be effectively utilized and an increase in the size of camera body 1 may be prevented. Further, because condenser 9 is located between lens mount 2 and cartridge bay 3, the empty space between lens mount 2 and cartridge bay 3 may also be effectively utilized, and an increase in the size of camera body 1—in width in particular—may be further prevented.

The second embodiment will be explained with reference to FIGS. 4 and 5.

Figure 4:
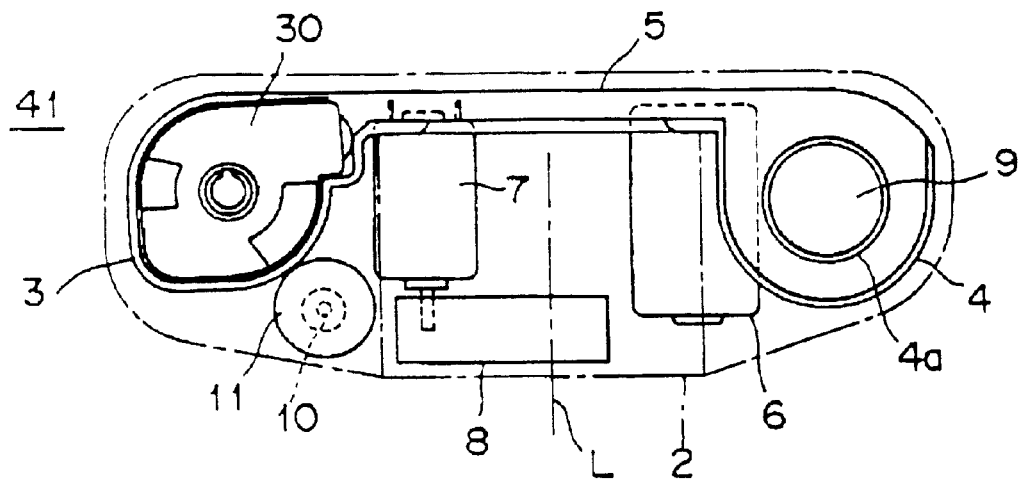
FIG. 4 is a plan view of important parts of the second embodiment of the camera pertaining to the present invention.
Figure 5:
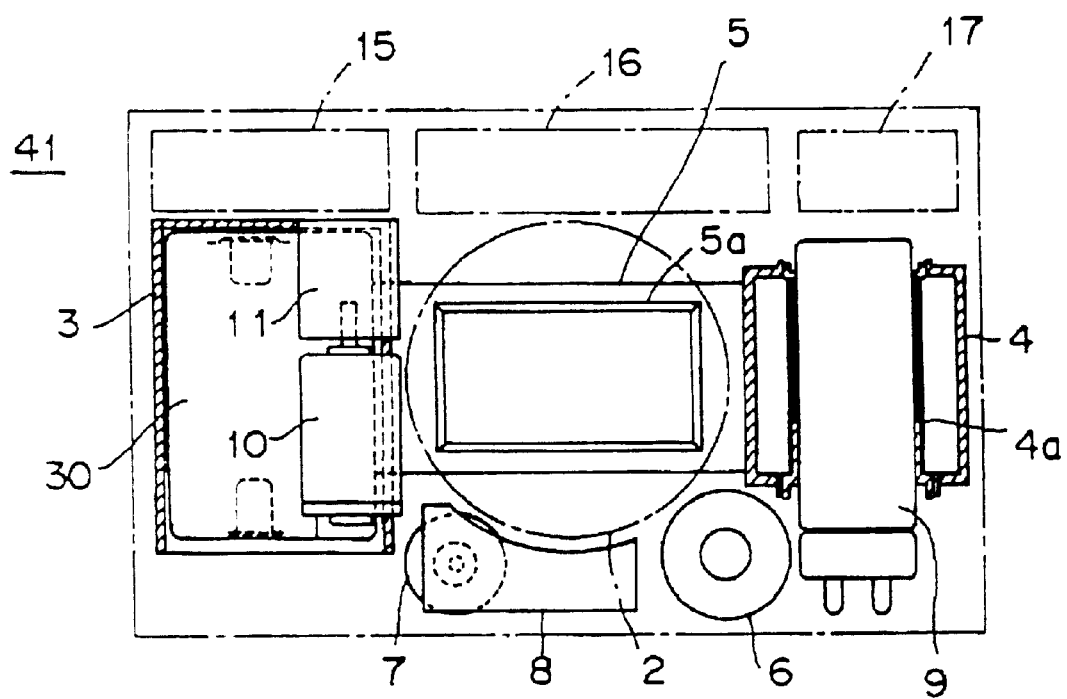
FIG. 5 is a front elevation of the camera shown in FIG. 4.

As shown in FIGS. 4 and 5, advanced photograph system camera body 41 has the same construction as advanced photograph system camera body 1 of the first embodiment except that the location of condenser 9 and the locations of feeding motor 10 and feeding reducer 11 are exchanged. In other words, cylindrical condenser 9 is inserted in hollow shaft 4a in spool bay 4 such that its axis is substantially perpendicular to optical axis L. Feeding motor 10 is placed, together with cylindrical feeding reducer 11, between lens mount 2 and cartridge bay 3 such that its rotational drive shaft is substantially perpendicular to optical axis L.

Advanced photograph system camera body 41 of the construction described above has battery 6 and zoom motor 7 below film conveyance path 5 between cartridge bay 3 and spool bay 4 such that their axes are substantially parallel to optical axis L, and therefore the empty space below film conveyance path 5 may be effectively utilized and an increase in the size of camera body 41 may be prevented. Further, because feeding motor 10 and feeding reducer 11 are located between lens mount 2 and cartridge bay 3, the empty space between lens mount 2 and cartridge bay 3 may also be effectively utilized, and an increase in the size of camera body 41—in width in particular—may be further prevented.

The third embodiment will be explained with reference to FIGS. 6 and 7.

Figure 6:
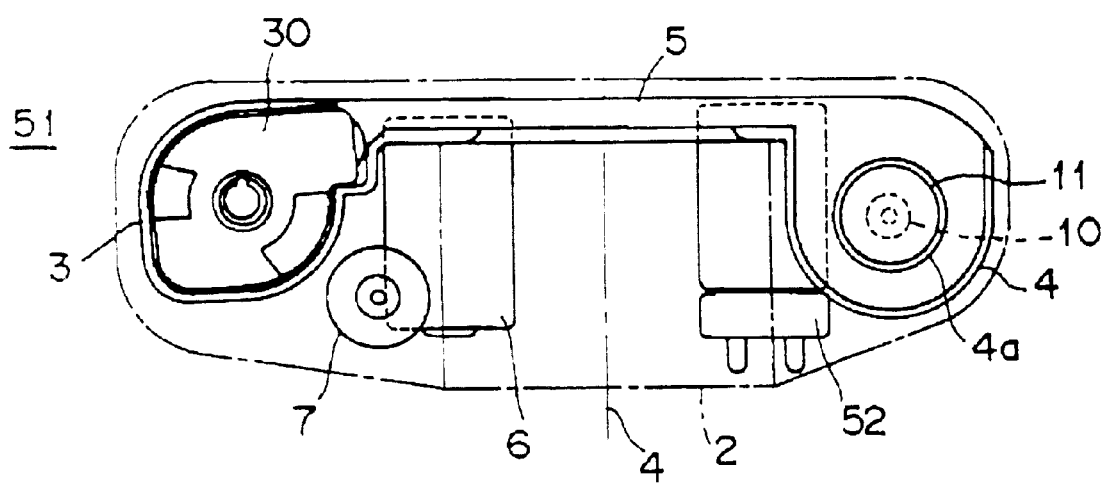
FIG. 6 is a plan view of important parts of the third embodiment of the camera pertaining to the present invention.
Figure 7:
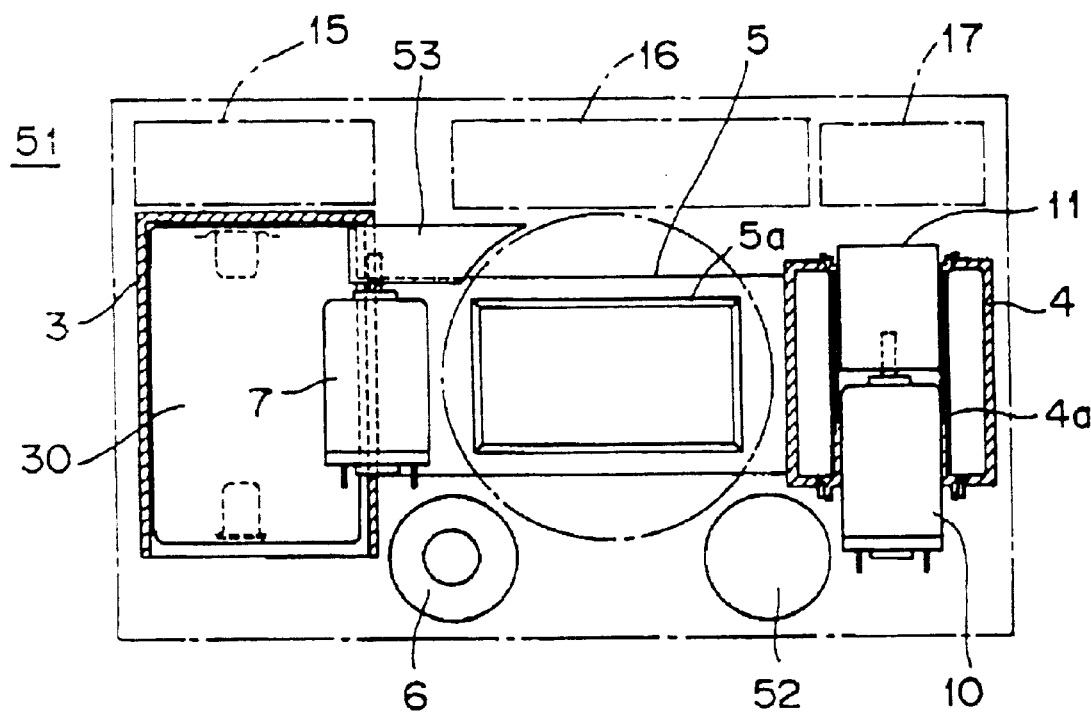
FIG. 7 is a front elevation of the camera shown in FIG. 6.

As shown in FIGS. 6 and 7, advanced photography system camera body 51 has substantially the same construction as advanced photograph system camera body 1 of the first embodiment except with respect to cylindrical battery 6, zoom motor 7, zoom reducer 53 and condenser 52.

Battery 6 is located below film conveyance path 5 and toward cartridge bay 3 such that its axis is substantially parallel to optical axis L. Zoom motor 7 is located, together with zoom reducer 53, between lens mount 2 and cartridge bay 3 such that its rotational drive shaft is substantially perpendicular to optical axis L. Condenser 52 is cylindrical, and it is desirable that its length be shorter than that of condenser 9 incorporated in advanced photograph system camera body 1 of the first embodiment described above, as this allows camera body 51 to be made thin. Condenser 52 is located below film conveyance path 5 and toward spool bay 4 such that its axis is substantially parallel to optical axis L.

Advance photograph system camera body 51 of the construction described above has battery 6 and condenser 52 below film conveyance path 5 between cartridge bay 3 and spool bay 4 such that their axes are substantially parallel to optical axis L, and therefore the empty space below film conveyance path 5 may be effectively utilized and an increase in the size of camera body 51 may be prevented. Further, since zoom motor 7 and zoom reducer 53 are located between lens mount 2 and cartridge bay 3, the empty space between lens mount 2 and cartridge bay 3 may also be effectively utilized, and an increase in the size of camera body 51—in width in particular—may be further prevented.

The fourth embodiment will be explained with reference to FIGS. 8 and 9.

Figure 8:
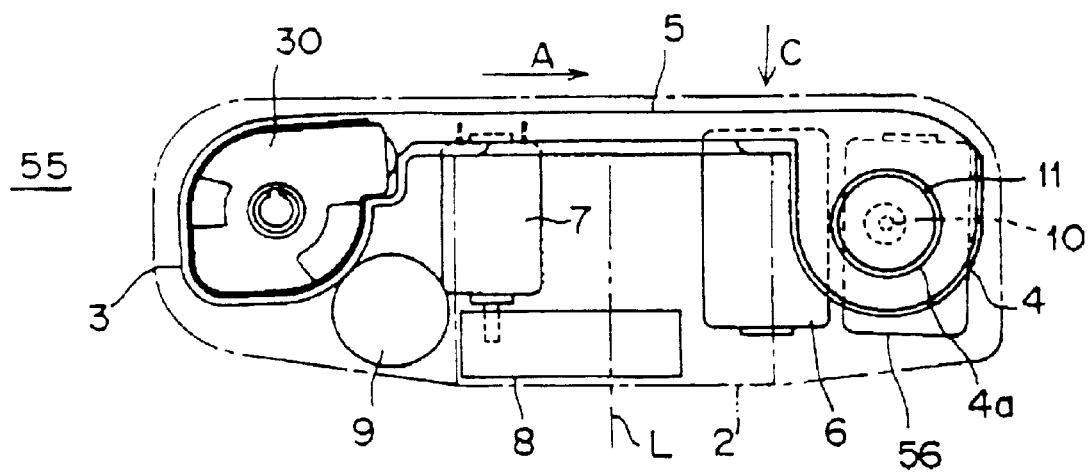
FIG. 8 is a plan view of important parts of the fourth embodiment of the camera pertaining to the present invention.
Figure 9:
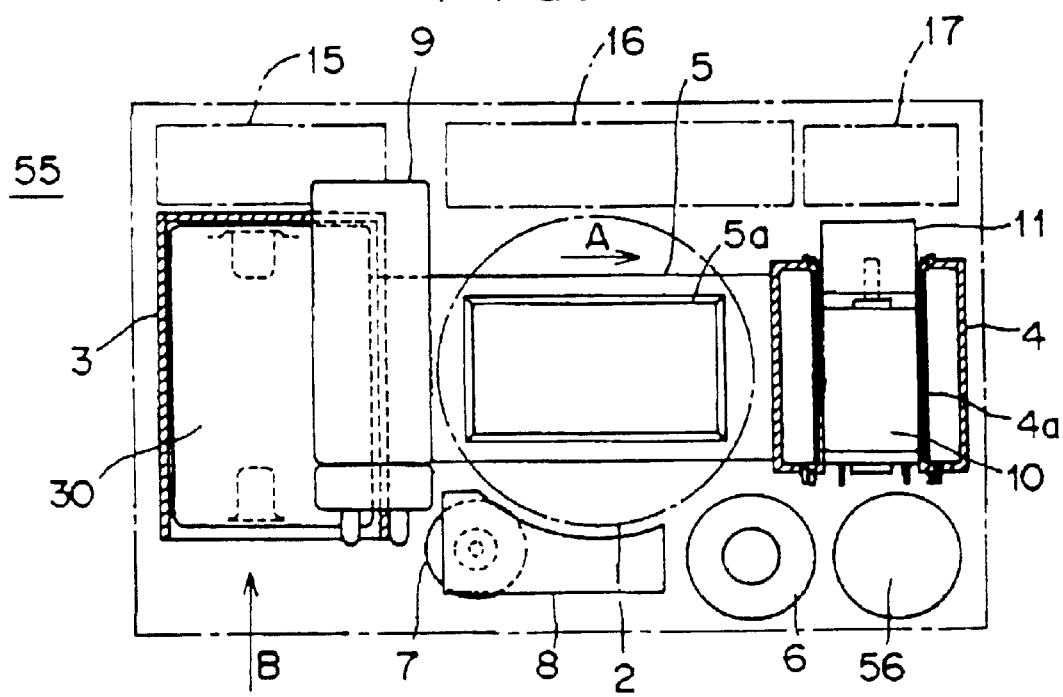
FIG. 9 is a front elevation view of the camera shown in FIG. 8.

As shown in FIGS. 8 and 9, the advanced photograph system camera body 55 has the same construction as the advanced photograph system camera body 1 of the first embodiment, except for the number of the battery.

A cylindrical battery 56 is placed below the spook bay 4 such that its axis is substantially parallel to the optical axis L. The batteries 6 and 56 are of a different size. The battery 56 is disposed in the opposite direction to the battery 6. The length of the batteries 6, 56 in their axis direction is longer than a diameter of the batteries 6, 56 and shorter than twice the diameter of the batteries 6, 56.

The fifth embodiment will be explained with reference to FIGS. 10 and 11.

Figure 10:
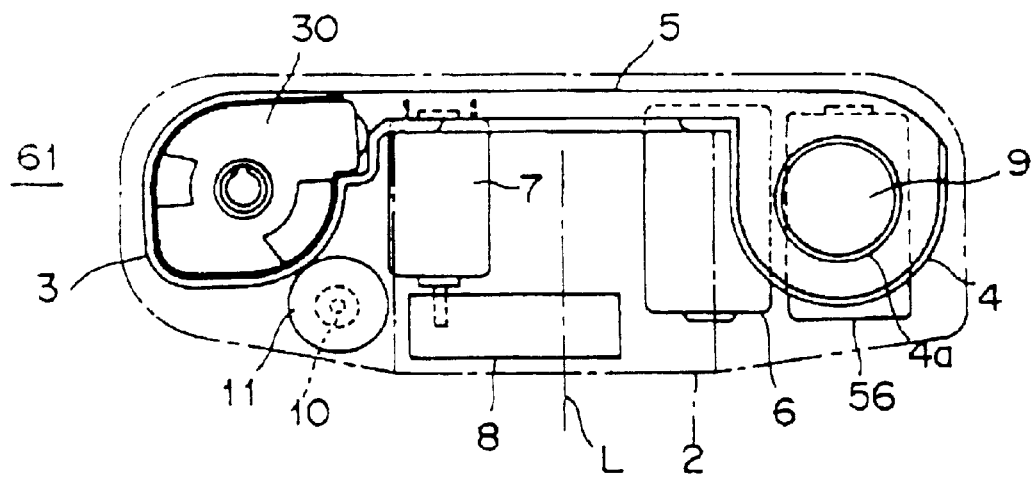
FIG. 10 is a plan view important parts of the fifth embodiment of the camera pertaining to the present invention.
Figure 11:
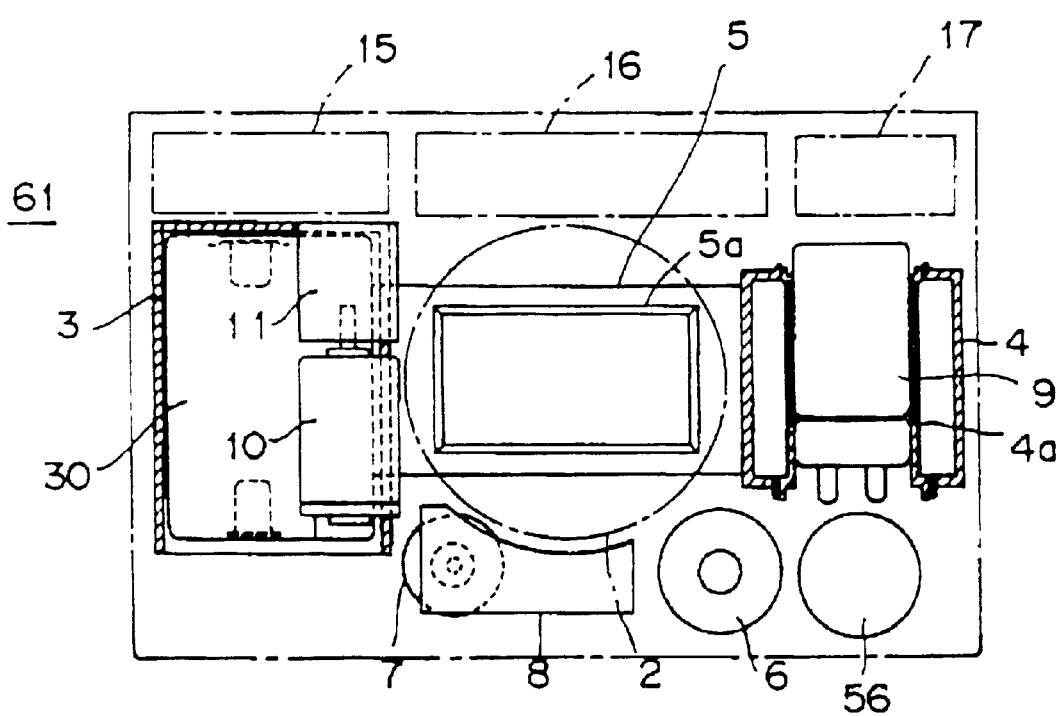
FIG. 11 is a front elevation view of the camera shown in FIG. 10.

As shown in FIGS. 10 and 11, the advanced photograph system camera body 61 has the same construction as the advanced photograph system camera body 41 of the second embodiment, except for the number of the battery.

A cylindrical battery 56 is placed below the spool bay 4 such that its axis is substantially parallel to optical axis L.

The batteries 6 and 56 are of a different size, as described above. The battery 56 is disposed in the opposite direction to the battery 6.

The sixth embodiment will be explained with reference to FIGS. 12 and 13.

Figure 12:
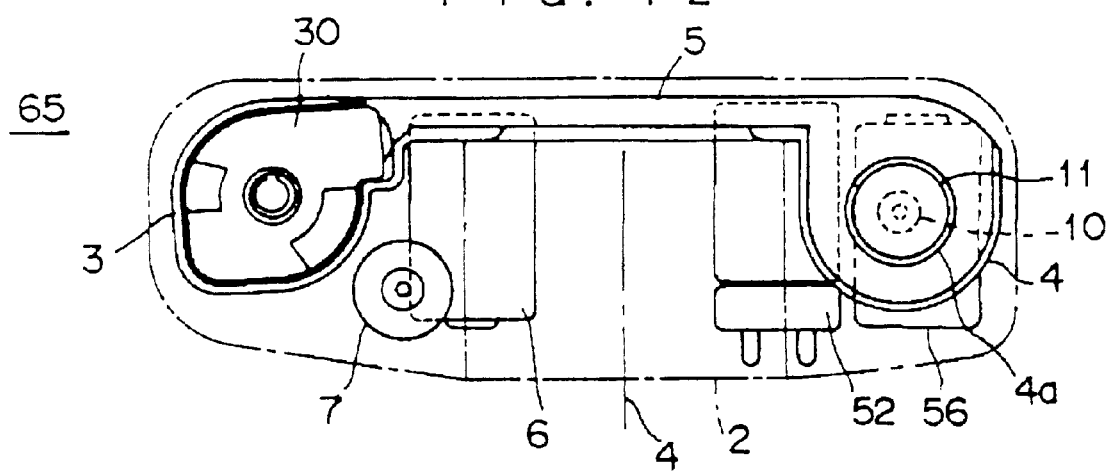
FIG. 12 is a plan view important parts of the sixth embodiment of the camera pertaining to the present invention.
Figure 13:
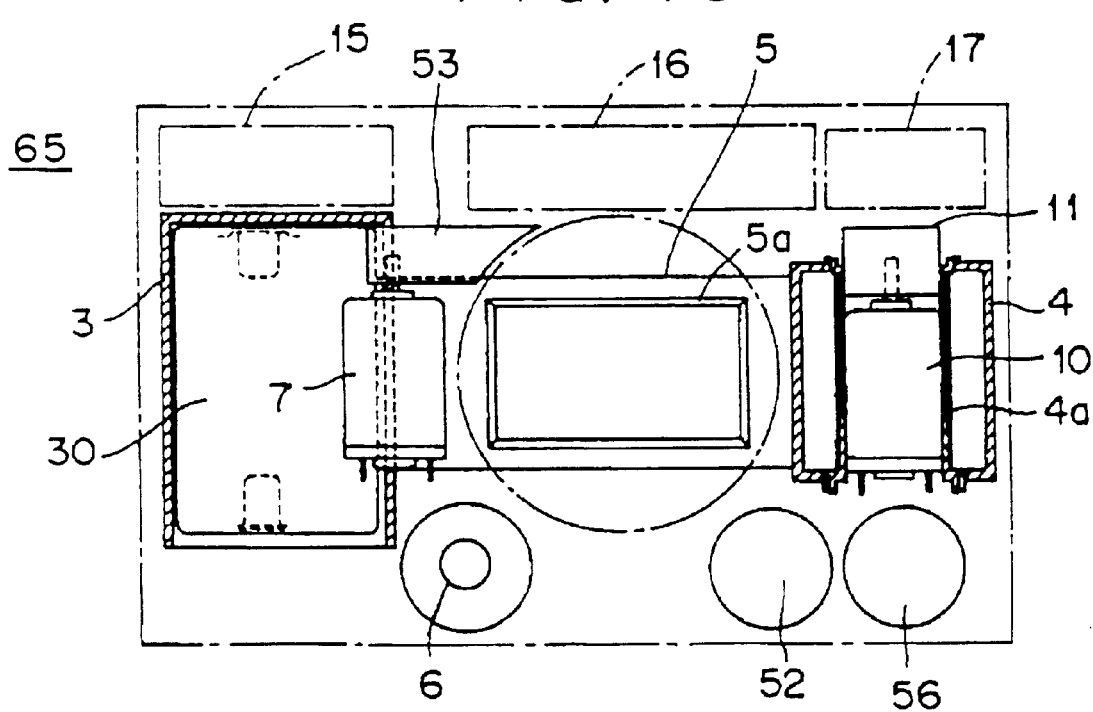
FIG. 13 is a front elevation view of the camera shown in FIG. 12.

As shown in FIGS. 12 and 13, the advanced photograph system camera body 65 has the same construction as advanced photograph system camera body 51 of the third embodiment, except for the number of the battery.

A cylindrical battery 56 is placed below the spool bay 4 such that its axis is substantially parallel to optical axis L.

The batteries 6 and 56 are of a different size, as explained above, and the battery 56 is disposed in the opposite direction to the battery 6.

The camera pertaining to the present invention is not limited to these embodiments explained above. It may vary within the range of the essence of the invention.

It is acceptable if battery cover 81 is located at the bottom of the camera body so that a battery may be loaded in the camera via the opening of this battery cover 81, as shown in FIG. 14. 82 is a finder and 83 is a cartridge cover.

While examples in which the battery or condenser is placed below the film conveyance path were used in the explanations of the embodiments above, it is naturally also acceptable if the battery or condenser is placed in the empty space above the film conveyance path.

As is clear from the explanations above, using the present invention, a battery or condenser is placed below or above the film conveyance path between the cartridge bay and the spool bay such that their axes are substantially parallel to the optical axis, and therefore the empty space below or above the film conveyance path may be effectively utilized and an increase in the size of the camera may be prevented.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. A camera comprising:

a camera body;

an optical device that leads a light of an object to a light sensing member in the camera body;

a space in the camera body that accommodates a plurality of cylindrical batteries, wherein the axis of each cylindrical battery is parallel to the optical axis of the optical device, and the axis of each of said plurality of cylindrical batteries are laterally arranged with respect to each other, in a direct substantially perpendicular to the optical axis of said optical device.

2. A camera according to claim 1, wherein the length of each battery in its axis direction is longer than a diameter of the battery and shorter than twice the diameter of the battery.

3. A camera according to claim 1, further comprising:

a battery cover having a plane cover portion, wherein said battery cover is located on the back side of a camera body.

4. A camera according to claim 1, further comprising:

a battery cover having a plane cover portion, wherein said battery cover is located on the bottom of a camera body.

5. A camera according to claim 1, wherein the space accommodates two cylindrical batteries close to each other.

6. A camera according to claim 1, wherein the space is divided into two areas on both sides of the optical device, and wherein each of said two areas accommodates a cylindrical battery.

7. A camera according to claim 1, further comprising:

a motor located placed in a camera body, wherein the axis of the motor is substantially parallel to the optical axis of said optical device.

8. A camera according to claim 1, wherein one of said plurality of cylindrical batteries is close to the optical device.

9. A camera according to claim 1, further comprising:

a spool bay, wherein said space is below the spool bay.

10. A camera comprising:

a camera body:

an optical device that leads a light of an object to a light sensing member in the camera body;

a space in the camera body that accommodates a plurality of batteries; wherein the plurality of batteries are laterally arranged with respect to each other such that a line connecting between the positive and negative pole of each respective battery is parallel to the optical axis of said optical device, and a line connecting a positive pole of one battery to a negative pole of an immediately laterally adjacent battery is substantially perpendicular to the optical axis of said optical device.

11. A camera according to claim 10, wherein the length of each battery in its axis direction is longer than a diameter of the battery and shorter than twice the diameter of the battery.

12. A camera according to claim 10, further comprising:

a battery cover having a plane cover portion, wherein said battery cover is located on the back side of a camera body.

13. A camera according to claim 10, further comprising:

a battery cover having a plane cover portion, wherein said battery cover is located on the bottom of a camera body.

14. A camera according to claim 10, wherein the space accommodates two cylindrical batteries close to each other.

15. A camera according to claim 10, wherein the space is divided into two areas on both sides of the optical device, and wherein each of said two areas accommodates a cylindrical battery.

16. A camera according to claim 10, further comprising:

a motor located placed in a camera body, wherein the axis of the motor is substantially parallel to the optical axis of said optical device.

17. A camera according to claim 10, wherein one of said plurality of cylindrical batteries is close to the optical device.

18. A camera according to claim 10, further comprising:

a spool bay, wherein said space is below the spool bay.

* * * * *